United States Patent [19]

Kawakami et al.

[11] Patent Number: 4,661,165

[45] Date of Patent: Apr. 28, 1987

[54] SOLVENT FOR THE DYE OF PRESSURE-SENSITIVE RECORDING PAPER

[75] Inventors: Shigenobu Kawakami, Ichikawa; Eiichi Matsuzaka, Kawasaki; Satoshi Narui, Ayase; Naoya Takahashi, Yokohama, all of Japan

[73] Assignee: Nippon Petrochemicals Company, Limited, Japan

[21] Appl. No.: 745,909

[22] Filed: Jun. 18, 1985

[30] Foreign Application Priority Data

Jun. 29, 1984 [JP] Japan ................................ 59-135540

[51] Int. Cl.[4] ......................... C08K 3/00; C09D 11/00

[52] U.S. Cl. ...................................... 106/311; 106/22; 106/32

[58] Field of Search ............................ 106/311, 20, 32

[56] References Cited

U.S. PATENT DOCUMENTS

| | | | |
|---|---|---|---|
| 3,846,331 | 11/1974 | Konishi | 106/311 |
| 4,302,620 | 11/1981 | Chu | 585/467 |
| 4,520,220 | 5/1985 | Watson | 585/467 |

OTHER PUBLICATIONS

Abstract—Japanese Patent J 55 071589.

Abstract—Japanese Patent J 56161195-A.

*Primary Examiner*—Theodore Morris

*Attorney, Agent, or Firm*—Scully, Scott, Murphy & Presser

[57] ABSTRACT

A solvent for the dye of pressure-sensitive recording paper which solvent has no offensive odor and both the color developing rate and the density of developed color are excellent. The solvent is characterized in that it comprises a fraction having boiling points in the range of 270° to 350° C. which is prepared by distilling the heavier products obtained from the process for producing ethyltoluene by alkylating toluene with ethylene in the presence of synthetic zeolite catalyst.

6 Claims, No Drawings

SOLVENT FOR THE DYE OF PRESSURE-SENSITIVE RECORDING PAPER

BACKGROUND OF THE INVENTION (1) Field of the Invention

This invention relates to a solvent for the dye of pressure-sensitive recording paper. More particularly, the invention relates to the solvent for the dye of pressure-sensitive recording paper which solvent is prepared from a heavier product that is obtained in the ethyltoluene production process by alkylating toluene with ethylene in the presence of synthetic zeolite catalyst.

(2) Description of the Prior Art

Various kinds of pressure-sensitive recording papers are hitherto well known. For example, a colorless dye, that is a dye-precursor, is dissolved in a solvent and the obtained solution is encapsulated into microcapsules by conventional methods. One surface of a sheet of paper is applied with the microcapsules and the surface of another sheet of paper is applied with a color developer such as clay or polymeric material which produces a color upon reacting with the dye. When the recording paper is used, the treated surfaces of the above set of paper sheets are put together face to face and local pressure is applied to the paired sheets by handwriting or typewriting, thereby obtaining desired duplicate impressions. Besides the above, several kinds of pressure-sensitive recording papers similar to the above are also known. These pressure-sensitive recording papers are used for duplicating and registering.

The recording mechanism in the pressure-sensitive recording paper is such that the microcapsules on the surface of a sheet of paper are ruptured by the pressure of handwriting or by the impact of typewriting to release the dye solution from the microcapsules. The solution containing a dye comes into contact with the color developer on the opposing surface of the other sheet of paper to produce a color. There may be another type of pressure-sensitive recording paper such that on the same surface of the paper are coated the color developer and microcapsules containing therein a dye solution.

The dyes for the pressure-sensitive recording paper are exemplified by Crystal Violet Lactone, Malachite Green, benzoyl Leucomethylene Blue, Rhodamine B, and 3-dialkylamino-7-dialkylamino fluoran.

The solvents for dissolving the dyes (to be exact, dye-precursors) are required to have the properties as follows:

(a) to have no toxicity and no offensive odor, (b) to be colorless or quite light-colored, and developed color should be stable to maintain its tint without suffering from fading, (c) not to hinder the color developing and to provide a high rate of color development, and (d) to produce clear and dense images without runs.

For the purpose to produce ethylbenzene, ethyltoluene and cumene, it has been widely put into industrial practice that hydrocarbons such as benzene and toluene are alkylated with olefins such as ethylene and propylene in the presence of alkylation catalysts to obtain alkylbenzenes. In this process, various kinds of alkylation catalysts such as aluminum chloride, solid phosphoric acid and boron fluoride are employed.

In the above alkylation process, heavier by-products containing diarylalkanes, triaryldialkanes and other impurities according to to the kinds of starting materials and alkylation catalyst, are obtained. As disclosed, for example, in Japanese Laid-Open Patent Publication Nos. 55-71589 and 56-161195, it is known that the heavier products, i.e ethylbenzene heavy end that is obtained from a process to alkylate benzene with ethylene in the presence of aluminum chloride catalyst, can be used as a solvent for the dye of pressure-sensitive recording paper.

The ethylbenzene heavy end disclosed in the above references are, however, not satisfactory because it contains unsaturated compounds and carbonyl compounds that cannot be easily removed only by distillation as disclosed in the above references, and accordingly, it has offensive odor and the stability of developed color is not good.

As the measure to solve these problems, the references propose the refining of the heavy end under severe conditions and the mixing of vegetable oils as masking agents. Furthermore, the solvent disclosed in the above references cannot be said that it is desirable in view of the color developing rate and the density of developed color due to chemical structures of its components of the solvent. Since the odor has naturally close relation to the chemical structures of compounds, the odors of the solvents disclosed in the above references are attributable to the components themselves as well as their impurities.

BRIEF SUMMARY OF THE INVENTION

As described above, there has never been any suitable solvent which is satisfactory in view of odor, color developing rate, color stability, cost and so forth.

It is, therefore, the primary object of the present invention to provide a novel and improved solvent for the dye of pressure-sensitive recording paper which is free from the above-described disadvantages in the conventional art.

Another object of the present invention is to provide a solvent for the dye of pressure-sensitive recording paper which has no offensive odor, be excellent in the color developing rate and in the density of developed color, be capable of producing stable color, and can be produced at lower cost.

The third object of the present invention is to provide a pressure-sensitive recording material using the above-mentioned solvent for a dye-precursor.

According to the present invention, the solvent for the dye of pressure-sensitive recording paper is characterized in that the solvent comprises a fraction having boiling points in the range of 270° to 350° C. which fraction is obtained by distilling the heavier products obtained from the process for producing ethyltoluene by alkylating toluene with ethylene in the presence of synthetic zeolite catalyst.

DETAILED DESCRIPTION OF THE INVENTION

The synthetic zeolite catalyst used for the above alkylation process is crystalline aluminosilicate zeolite. Preferable ones are ZSM-5 type synthetic zeolites such as those known as ZSM-5 zeolite and ZSM-11 zeolite. These ZSM-5 type synthetic zeolites are described in the following patent specifications.

| | |
|---|---|
| ZSM-5 | U. S. Pat. No. 3,702,886<br>British Patent No. 1,161,974 |

-continued

| | |
|---|---|
| ZSM-11 | U. S. Pat. No. 3,709,979 |

The molar ratio as $SiO_2/Al_2O_3$ of ZSM-5 type synthetic zeolite is generally in the range of 20 to 400 and the zeolite shows a specific X-ray diffraction pattern. (cf: The above patent publications)

The synthetic zeolite suitably used in the present invention is the one which is ion-exchanged with hydrogen ions, divalent ions such as magnesium, potassium, strontium and barium, and trivalent ions such as rare earth elements of cerium and yttrium. Furthermore, synthetic zeolite which is modified with boron, gallium, phosphorus or their compounds can be used.

The alkylation can be carried out in a gaseous phase or in a liquid phase. It is generally done in a gaseous phase at temperatures in the range of 300° to 650° C., preferably 350° to 550° C. If the reaction temperature is lower than 300° C., the alkylation cannot be proceeded effectively. On the other hand, if the reaction temperature is above 650° C., side-reactions such as decomposition and the rupture of the crystalline structure of zeolite catalyst are caused to occur. Therefore, the temparatures outside the above range are not preferable. The pressure for the alkylation is not especially limited, but it may be in the range of 1 to 100 kg/cm$^2$ and it is generally performed at atmospheric pressure. The preferable molar ratio of the starting materials, ethylene/toluene, is in the range of 0.05 to 10. The value of WHSV is 1 to 500 and preferably 1 to 300.

In the above alkylation process, a reaction mixture containing unreacted toluene, ethyltoluene, polyethyltoluene and heavier products is obtained. The above unreacted toluene, ethyltoluene and polyethyltoluene are then removed from this reaction mixture by distillation to obtain heavier products having boiling points of 250° C. or higher.

Because of the use of synthetic zeolite catalyst as an alkylation catalyst, the quantity of tarry substance contained in the heavier products is very small which fact is quite different from the reaction in which aluminum chloride catalyst is used. Furthermore, the quantities of unsaturated compounds and carbonyl compounds that will impair the tint and thermal stability of developed color, are also very small. It is, however, possible to subject the heavier products to refining treatment, if desired. This refining treatment is not different from those which are generally employed for common solvents. For example, any of acid treatment with activated clay or sulfuric acid, or alkali treatment may be employed. It is possible to apply this refining treatment after the next distillation step.

The fraction having boiling points in the range of 270° to 350° C., preferably 275° to 320° C., according to the present invention is obtained by distilling the foregoing heavier products. The component having a boiling point below 270° C. is not desirable because it has offensive odor and the characteristics as a solvent of the present invention is inferior. On the other hand, the component having a boiling point above 350° C. is not desirable too because the viscosity is high and color developing property is not good.

The fraction obtained through the above-described procedure contains diarylalkanes as main components, which diarylalkanes are represented by the molecular formula:

$C_nH_{2n-14}$ (n=14 to 16), and by the following structural formula (I):

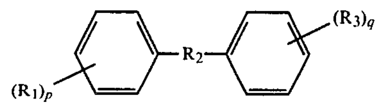

(I)

wherein each $R_1$ and $R_3$ is a hydrogen atom, a methyl group or an ethyl group and $R_2$ is a methylene group, ethylene group or ethylidene group, and p and q are integers from 1 to 3.

The examples of the above formula (I) are phenyltolylmethane or phenyltolylethane or the like.

Because the fraction according to the present invention scarcely contains tarry substance, unsaturated components and carbonyl compounds as described above, it has no offensive odor and provides stability in the tint and density of developed color, which is different from the product that is obtained by using an alkylation catalyst of aluminum chloride. Furthermore, owing to the alkylation catalyst and toluene used as the starting material, the chemical structures of contained diarylalkanes are different from those of the ethylbenzene heavy end obtained by using aluminum chloride catalyst and benzene. Accordingly, the solvent of the invention has no offensive odor and provides excellent color developing rate and color density.

The specific solvents according to the present invention can be used singly or in combination of two or more kinds of other solvents. They can be used also by being mixed with other liquids so long as the properties as the solvents are not impaired. For example, the specific solvent can be used as a mixture with kerosene.

As the dye-precursors, there are typically triarylmethane type compounds, diphenylmethane type compounds, xanthene type compounds, thiazine type compounds, and spiropyran type compounds.

The dye-precursors of triarylmethane type compounds are exemplified by:

3,3-bis(p-dimethylaminophenyl)-6-dimethylaminophthalide (Crystal Violet Lactone);

3,3-bis(p-dimethylaminophenyl)phthalide;

3-(p-dimethylaminophenyl)-3-(1,2-dimethylindole-3-yl)phthalide;

3-(p-dimethylaminophenyl)-3-(2-methylindole-3-yl)phthalide;

3-(p-dimethylaminophenyl)-3-(2-phenylindole-3-yl)phthalide;

3,3-bis(1,2-dimethylindole-3-yl)-5-dimethylaminophthalide;

3,3-bis(1,2-dimethylindole-3-yl)-6-dimethylaminophthalide;

3,3-bis(9-ethylcarbazole-3-yl)-5-dimethylaminophthalide;

3,3-bis(2-phenylindole-3-yl)-5-dimethylaminophthalide; and 3-p-dimethylaminophenyl-3-(1-methylpyrrole-2-yl)-6-dimethylaminophthalide.

The dye-precursors of diphenylmethane type compounds are exemplified by:

4,4-bis-dimethylaminobenzhydrine benzyl ether; N-halophenyl leuco Auramine; and N-2,4,5-trichlorophenyl leuco Auramine.

The xanthene type dye-precursors are exemplified by:

Rhodamine B-anilinolactam;
Rhodamine B-(p-nitroanilino)lactam;
Rhodamine B-(p-chloroanilino)lactam;
3-dimethylamino-6-methoxyfluoran;
3-diethylamino-7-methoxyfluoran;
3-diethylamino-7-chloro-6-methylfluoran;
3-diethylamino-7-(acetylmethylamino)fluoran;
3-diethylamino-7-(dibenzylamino)fluoran;
3-diethylamino-7-(methylbenzylamino)fluoran;
3-diethylamino-7-(chloroethylmethylamino)fluoran;
3-diethylamino-7-(diethylamino)fluoran; and
3-diethylamino-6-methyl-7-anilinofluoran.

The thiazine type dye-precursors are exemplified by: benzoyl leuco methylene blue and p-nitrobenzoyl leuco methylene blue.

The spiro type dye-precursors are exemplified by:
3-methyl-spiro-dinaphthopyran;
3-ethyl-spiro-dinaphthopyran;
3,3'-dichloro-spiro-dinaphthopyran;
3-benzyl-spiro-dinaphthopyran;
3-methylnaphtho-(3-methoxybenzo)spiropyran; and
3-propyl-spiro-dibenzodipyran.

The dye-precursors can be dissolved into the solvent of the invention in the manner likewise the use of conventional solvents.

As the color developer, there are clay, polymers, and aromatic carboxylic acids or their metal salts.

The polymers are exemplified by phenol-aldehyde polymer, phenol-acetylene polymer, maleic acid-rosin polymer, partially or completely hydrolyzed styrene-maleic anhydride copolymer, partially or completely hydrolyzed ethylenemaleic anhydride copolymer, carboxy polyethylene, and partially or completely hydrolyzed vinyl methyl ether-maleic anhydride copolymer.

The examples of aromatic carboxylic acids and their derivatives are exemplified by:
3,5-di(α-methylbenzyl)salicylic acid;
3-(α-methylbenzyl)-5-(α,α-dimethylbenzyl)salicylic acid;
3-(4'-α',α'-dimethylbenzyl)phenyl-5-(α,α-dimethylbenzyl)salicylic acid;
3,5-di-tert-butyl salicylic acid;
3,5-di-tert-octyl salicylic acid;
3-cyclohexyl-5-(α,α-dimethylbenzyl)salicylic acid;
3-phenyl-5-(α,α-dimethylbenzyl)salicylic acid; and
3,5-di(α,α-dimethylbenzyl)salicylic acid. Furthermore, their salts of polyvalent metals such as zinc, aluminum, barium, tin, iron, calcium and lead can also be used.

As the method to prepare the microcapsules of the dye-precursor solution, which is obtained by dissolving a dye-precursor into the solvent, there is a coacervation method in which the fine particles of the dye-precursor solution that are dispersed in water are coated by a protective colloidal material such as gelatin or gum arabic, thereby obtaining the microcapsules which contain therein the dye-precursor solution. Another method is the interfacial polymerization method or a in situ polymerization method in which a monomer or a partially condensed polymerizable product is employed and a polymerization initiator, an accelerator or a catalyst is added to cause polymerization on the surfaces of fine particles of the dye-precursor solution, thereby preparing the microcapsules containing therein the dye-precursor solution. The specific solvent of the present invention can be used in any one of the above methods.

In the practical process for preparing microcapsules in the conventional art, an auxiliary solvent has been used in dissolving a dye-precursor in order to control the viscosity and volatility of the dye-precursor solution, the particle size of the fine dispersion in microcapsule formation, the dissolving property to the polymeric material that is coated onto the surface to be recorded, and the rate of color development. However, the specific solvent of the present invention can satisfactorily be used without employing such an auxiliary solvent. Nevertheless, any solvent which does not degrade the characteristics of the solvent of the present invention may be used as an auxiliary solvent. It should be noted also that the specific solvent of the present invention can be used together with conventional solvents.

The present invention will be described in more detail with reference to examples.

PREPARATION EXAMPLE

To a stainless steel-made continuous reaction vessel was added 100 g of synthetic zeolite ZSM-5 [$H^+$-type, $SiO_2/Al_2O_3$ (molar ratio)=60] and toluene was alkylated with ethylene under the following conditions:

Reaction temperature: 450° C.
Reaction pressure: Atmospheric
Ethylene/toluene (mole): 0.2
W H S V: 4.5

The obtained reaction mixture was distilled and the fractions of boiling points below 250° C. containing unreacted toluene, ethyltoluene and polyethyltoluene were distilled off to obtain heavier products in a yield of 2.1%.

The heavier component are then distilled under reduced pressure to obtain a fraction (A) having a boiling range of 275° to 320° C. (atmospheric pressure).

According to the analysis of this fraction (A), it mainly contained diarylalkanes. The composition and properties are shown in the following.

| | |
|---|---|
| **Analytical Composition:** | |
| Diarylalkanes ($C_nH_{2n-14}$) | 85.0% by weight |
| (n = 14) | (15.3) |
| (n = 15) | (43.8) |
| (n = 16) | (25.9) |
| Others | 15.0% |
| Total | 100.0% |
| **Properties:** | |
| Bromine Value | 0.05 cg/g |
| Pour Point | below −50° C. |
| Viscosity | 4.6 cSt (at 40° C.) |

COMPARATIVE PREPARATION EXAMPLE

Benzene and ethylene in a molar ratio of 5:1 were reacted together in a reaction vessel with a stirrer at 130° C. for 1 hour in the presence of $AlCl_3$ catalyst. After deactivation of the catalyst, unreacted benzene, ethylbenzene and polyethylbenzene were distilled off and the remainder was further distilled under a reduced pressure to obtain a fraction (B) of a boiling range of 265 to 280 (atmospheric pressure). The fraction (B) contained 86% of 1,1-diphenylethane.

EXAMPLE

Using the fractions (A) and (B), pressuresensitive recording papers were made and color developing rates and color densities of them were determined.

For comparison purpose, the fraction (B) was refined by activated clay at 120° C. for 40 minutes. The obtained refined fraction is referred to as "fraction (C)".

To 100 g of each fraction was added 5 g of Crystal Violet Lactone. In all fractions, the dye was completely dissolved.

To each fraction containing the dye was then added 100 g of gelatin and it was emulsified. Water was further added to it to make up 600 g of the emulsion. After adjusting pH to 4.5 with adding carboxymethyl cellulose aqueous solution, microcapsules were prepared by curing the membrane of microcapsules with glutaraldehyde. An adhesive (carboxymethyl cellulose solution) and a blocking agent were added to the obtained microcapsule slurry and mixed well. It was uniformly applied to the surface of fine quality paper and dried. The coated paper was weighed at 25°±1° C. and 60% of relative humidity to determine the quantity of microcapsules applied to the paper. These papers were used as test papers.

Each set of pressure-sensitive recording paper was made by joining the above test paper (CB paper) to another sheet of paper (CF paper) that was coated with activated clay. A load of 675 $kg/cm^2$ was applied to the pair of paper sheets. The color densities of developed blue colors of 1 minute, 10 minutes and 60 minutes after removing the load were determined as follows:

The color density was determined by a color-difference meter. With the reflection coefficient of magnesium oxide as 100, reflection coefficients of CF paper before color developing and the respective times after color developing were determined. The color densities were calculated by the following equation:

$$\text{Color Density} = \frac{(RC\text{-}I) - (RC\text{-}II)}{(RC\text{-}I)} \times 100$$

where RC-I was the reflection coefficient of CF paper before color developing and RC-II was the reflection coefficient of CF paper after color developing.

The results were represented by the following criteria in Table 1.

TABLE 1

| | Criteria for Color Densities | |
|---|---|---|
| Judgement | Color Density after 1 minute | Color Density after 10 and 60 minutes |
| ◎ | 65 or higher | 70 or higher |
| | 60–64 | 60–69 |
| Δ | 55–59 | 59 or lower |
| X | 54 or lower | — |

The odors were determined as follows:

Sensory tests were carried out with regard to the above pressure-sensitive recording papers by ten test panels (5 men and 5 women). The evaluation was made as: "offensive odor exists": 1; "no strong offensive odor": 2; and "none of detectable offensive odor": 3. The overall evaluation was the average of evaluated values.

The results of the above tests are shown in the following Table 2.

TABLE 2

| | Density of Developed Color | | | |
|---|---|---|---|---|
| Fraction | After 1 min. | After 10 min. | After 60 min. | odor |
| Fraction A | ◎ | ◎ | ◎ | 2.9 |
| Fraction B | ○ | ○ | ◎ | 1.6 |
| Fraction C | ○ | ○ | ◎ | 1.8 |

As will be understood from the above description, the solvent according to the present invention used for the dye of pressure-sensitive recording paper has no offensive odor and both the developing rate and the density of developed color are excellent.

What is claimed is:

1. A solvent for dyes employed in pressure sensitive recording paper which is characterized in that said solvent consists essentially of a fraction having a boiling point in the range of 270° to 350° C. which is obtained by alkylating toluene with ethylene in the presence of a synthetic zeolite catalyst to obtain a reaction mixture containing unreacted toluene, ethyltoluene, polyethyltoluene and heavier products, said unreacted toluene, ethyltoluene and polyethyltoluene being removed from said reaction mixture to obtain heavier products having a boiling point of greater than 250° C., and distilling said heavier products obtained to produce said fraction.

2. The solvent for dyes employed in pressure sensitive recording paper in claim 1, wherein said synthetic zeolite catalyst is crystalline aluminosilicate zeolite.

3. The solvent for dyes employed in pressure sensitive recording paper in claim 2, wherein said crystalline alumino-silicate zeolite is a ZSM-5 type zeolite catalyst.

4. The solvent for dyes employed in pressure sensitive recording paper in claim 1, wherein said alkylation is carried out at temperatures in the range of 300° to 650° C.

5. A pressure-sensitive recording material made by using a dye-precursor dissolved in the solvent of claim 1, which dye-precursor produces a color when said dye-precursor is brought into contact with a color developer.

6. A solvent for dyes employed in pressure sensitive recording paper in claims 1 or 5, wherein said fraction contains as the main components a mixture of $C_1$–$C_{16}$ diarylalkanes having the structure:

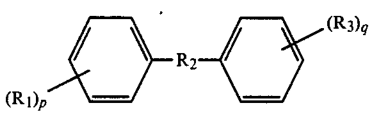

wherein each $R_1$ and $R_3$ are selected from the member of the group consisting of hydrogen, methyl or ethyl and $R_2$ is selected from a member of the group consisting of a methylene group, ethylene group or ethylidene group, and p and q are integers from 1 to 3.

* * * * *

UNITED STATES PATENT AND TRADEMARK OFFICE

CERTIFICATE OF CORRECTION

PATENT NO. : 4,661,165

DATED : April 28, 1987

INVENTOR(S) : Shigenobu Kawakami, et al.

It is certified that error appears in the above-identified patent and that said Letters Patent is hereby corrected as shown below:

Column 7, line 49: Table I, column labelled "Judgement" "O" is missing from line 49.

Signed and Sealed this

Twenty-ninth Day of September, 1987

*Attest:*

DONALD J. QUIGG

*Attesting Officer* *Commissioner of Patents and Trademarks*